(12) United States Patent
Guy

(10) Patent No.: US 12,174,642 B2
(45) Date of Patent: Dec. 24, 2024

(54) MODULAR ROBOTIC SYSTEM

(71) Applicant: Keith Alan Guy, San Luis Obispo, CA (US)

(72) Inventor: Keith Alan Guy, San Luis Obispo, CA (US)

(73) Assignee: Keith Guy, San Luis Obispo, CA (US)

( * ) Notice: Subject to any disclaimer, the term of this patent is extended or adjusted under 35 U.S.C. 154(b) by 0 days.

(21) Appl. No.: 15/188,809

(22) Filed: Jun. 21, 2016

(65) Prior Publication Data
US 2017/0364073 A1     Dec. 21, 2017

(51) Int. Cl.
*G05D 1/00*     (2024.01)
*B25J 9/00*     (2006.01)

(52) U.S. Cl.
CPC .............. *G05D 1/0293* (2013.01); *B25J 9/00* (2013.01)

(58) Field of Classification Search
CPC ...... G01C 23/00; G01C 21/34; B64C 39/024; B64C 37/02; B64C 2201/128; B64D 1/22; G05D 1/0088; G05D 1/0287; G05D 1/0293; G05D 2201/0216; B25J 9/00; B25J 5/005; B62D 55/07
See application file for complete search history.

(56) References Cited

U.S. PATENT DOCUMENTS

| | | | |
|---|---|---|---|
| 3,746,279 A * | 7/1973 | Maciolek | G05D 1/0858 244/17.13 |
| 6,453,212 B1 * | 9/2002 | Asama | B25J 9/162 701/28 |
| 7,400,108 B2 | 7/2008 | Minor et al. | |
| 7,874,386 B2 | 1/2011 | Ben-Tzvi et al. | |
| 8,225,892 B2 | 7/2012 | Ben-Tzvi | |
| 9,004,200 B2 | 4/2015 | Ben-Tzvi | |

(Continued)

FOREIGN PATENT DOCUMENTS

| | | |
|---|---|---|
| WO | 2012125903 | 9/2012 |
| WO | 2015116273 | 8/2015 |

OTHER PUBLICATIONS

Kube et al., Cooperative transport by ants and robots, 2000, Robotics and Autonomous Systems, Elsevier, pp. 85-101 (Year: 2000).*

(Continued)

*Primary Examiner* — Sze-Hon Kong
(74) *Attorney, Agent, or Firm* — Fish IP Law, LLP

(57) ABSTRACT

Methods and devices for generally fungible robots that autonomously cooperate to transport a load are provided. A method of transporting a load includes providing first and second robots each having a motive mechanism independently operable from the other. Each robot obtains estimates of a width, length, and height of the load. Each robot can obtain estimates of a weight or stability information of the load. Each robot autonomously determines how to engage the load for transportation based at least partially on the width, length, height, and weight of the load, as well as physical limitations of each robot and the terrain between the load and the delivery point. The robots autonomously cooperate with each other to transport the load. In another aspect, robots autonomously monitor the stability of a load, determine optimum configuration for stable transport of the load, and reconfigure based on stability changes during transport.

14 Claims, 10 Drawing Sheets

(56) References Cited

U.S. PATENT DOCUMENTS

| | | | |
|---|---|---|---|
| 9,073,624 B2* | 7/2015 | Jones | B64C 19/02 |
| 9,079,662 B1* | 7/2015 | Duffy | B64C 37/02 |
| 9,096,281 B1 | 8/2015 | Li et al. | |
| 9,193,066 B2 | 11/2015 | Ohm et al. | |
| 9,205,922 B1* | 12/2015 | Bouwer | B64D 9/00 |
| 9,358,975 B1* | 6/2016 | Watts | B60W 30/04 |
| 9,393,686 B1* | 7/2016 | Bradski | B25J 9/163 |
| 9,403,566 B2* | 8/2016 | Jacobsen | B62D 37/04 |
| 9,513,627 B1* | 12/2016 | Elazary | G05D 1/0289 |
| 9,524,648 B1* | 12/2016 | Gopalakrishnan | G08G 5/0082 |
| 9,733,646 B1* | 8/2017 | Nusser | B65G 1/137 |
| 9,757,855 B2* | 9/2017 | Bewley | B25J 5/005 |
| 9,827,677 B1* | 11/2017 | Gilbertson | B25J 9/046 |
| 9,969,486 B1* | 5/2018 | O'Brien | B64C 39/024 |
| 10,144,126 B2* | 12/2018 | Krohne | B64F 5/10 |
| 10,793,047 B1* | 10/2020 | Theobald | B60P 1/54 |
| 2006/0095169 A1* | 5/2006 | Minor | G05D 1/0293 701/23 |
| 2006/0213167 A1* | 9/2006 | Koselka | A01D 46/30 56/10.2 A |
| 2007/0239315 A1* | 10/2007 | Sato | B25J 9/1612 700/245 |
| 2008/0302200 A1* | 12/2008 | Tobey | B25J 18/06 901/14 |
| 2009/0249606 A1* | 10/2009 | Diez | B23K 11/11 29/428 |
| 2009/0299551 A1* | 12/2009 | So | B64C 39/024 701/3 |
| 2011/0031044 A1 | 2/2011 | Gal | |
| 2011/0040427 A1* | 2/2011 | Ben-Tzvi | B62D 55/075 701/2 |
| 2011/0240382 A1* | 10/2011 | Gettings | B62D 55/075 180/9.1 |
| 2012/0210853 A1* | 8/2012 | Abershitz | B64F 1/04 89/1.11 |
| 2013/0011234 A1* | 1/2013 | Pretlove | B25J 5/005 701/2 |
| 2014/0224377 A1* | 8/2014 | Bonefas | A01D 43/073 141/1 |
| 2014/0246257 A1* | 9/2014 | Jacobsen | B62D 37/04 180/14.2 |
| 2014/0303814 A1* | 10/2014 | Burema | A01B 79/005 701/3 |
| 2014/0374532 A1* | 12/2014 | Duffy | B64C 37/02 244/2 |
| 2015/0081092 A1* | 3/2015 | Jacobsen | B25J 9/065 700/245 |
| 2015/0120094 A1* | 4/2015 | Kimchi | B64C 39/024 701/3 |
| 2015/0120126 A1* | 4/2015 | So | G01C 23/00 701/26 |
| 2015/0136012 A1* | 5/2015 | Williams | B25J 9/08 901/1 |
| 2015/0158576 A1* | 6/2015 | Jones | B64C 19/02 701/2 |
| 2015/0251713 A1 | 9/2015 | Couture et al. | |
| 2016/0082589 A1 | 3/2016 | Skrinde | |
| 2016/0114839 A1 | 4/2016 | Ohm et al. | |
| 2016/0125746 A1* | 5/2016 | Kunzi | G05D 1/0088 701/11 |
| 2016/0129592 A1* | 5/2016 | Saboo | B25J 9/1661 700/248 |
| 2016/0132059 A1* | 5/2016 | Mason | G05D 1/0246 701/28 |
| 2016/0176452 A1* | 6/2016 | Gettings | B62D 55/0885 180/167 |
| 2016/0246304 A1* | 8/2016 | Canoy | G05D 1/0816 |
| 2016/0264234 A1* | 9/2016 | Vaughn | A63H 27/12 |
| 2016/0307448 A1* | 10/2016 | Salnikov | A01B 79/02 |
| 2016/0362147 A1* | 12/2016 | Mailey | A61G 5/061 |
| 2016/0378108 A1* | 12/2016 | Paczan | B64C 37/02 705/330 |
| 2017/0023947 A1* | 1/2017 | McMillion | B64U 80/25 |
| 2017/0066490 A1* | 3/2017 | Fauroux | B60P 3/40 |
| 2017/0142766 A1* | 5/2017 | Kim | H04W 48/20 |
| 2017/0144757 A1* | 5/2017 | Hall | B64C 39/024 |
| 2017/0291704 A1* | 10/2017 | Alegria | B64C 39/022 |
| 2018/0086460 A1* | 3/2018 | Beaman | B64D 1/00 |
| 2018/0317725 A1* | 11/2018 | Lee | A47L 11/201 |
| 2019/0127063 A1* | 5/2019 | Gozluklu | B64C 39/024 |

OTHER PUBLICATIONS

Dorigo et al., Cooperative Transport of Objects of Different Shapes and Sizes, 2004, Springer-Verlag Berlin Heidelberg, pp. 106-117 (Year: 2004).*

Grob et al., Evolving a Cooperative Transport Behavior for Two Simple Robots, 2004, Springer-Verlag Berlin Heidelberg, pp. 305-316 (Year: 2004).*

Miyata et al., Cooperative Transport by Multiple Mobile Robots in Unknown Static Environments Associated With Real-Time Task Assignment, 2002, IEEE Transactions on Robotics and Automation, vol. 18, No. 5, pp. 769-780 (Year: 2002).*

Inoue et al., Object Transportation by Two Humanoid Robots using Cooperative Learning, 2004, IEEE, pp. 1201-1208 (Year: 2004).*

Rubenstein et al., Collective Transport of Complex Objects by Simple Robots: Theory and Experiments, 2013, Proceedings of the 12th International Conference on Autonomous Agents and Multiagent Systems, pp. 1-8 (Year: 2013).*

Yamashita et al., Motion Planning for Cooperative Transportation of a Large Object by Multiple Mobile Robots in a 3D Environment, 2000, Proceedings of the 2000 IEEE International Conference on Robotics & Automation, pp. 3144-3151 (Year: 2000).*

Yamashita et al., Motion Planning of Multiple Mobile Robots for Cooperative Manipulation and Transportation, Apr. 2003, IEEE Transactions on Robotics and Automation, vol. 19, No. 2, pp. 223-237 (Year: 2003).*

Hirata et al., Coordinated Transportation of a Single Object by Multiple Mobile Robots without Position Information of Each Robot, 2000, Proceedings of the 2000 IEEE/RSJ International Conference on Intelligent Robots and Systems, pp. 2024-2029 (Year: 2000).*

Machado et al., Multi-constrained joint transportation tasks by teams of autonomous mobile robots using a dynamical systems approach, May 16-21, 2016, 2016 IEEE International Conference on Robotics and Automation (ICRA), pp. 3111-3117 (Year: 2016).*

Yamashita et al., Motion Planning for Cooperative Transportation of a Large Object by Multiple Mobile Robots in a 3D Environment, Apr. 2000, Proceedings of the 2000 IEEE International Conference on Robotics & Automation, pp. 3144-3151 (Year: 2000).*

Montemayor et al., Decentralized Collaborative Load Transport by Multiple Robots, Apr. 2005, Proceedings of the 2005 IEEE International Conference on Robotics and Automation, pp. 372-377 (Year: 2005).*

Hashimoto et al, Dynamic Control Approach for Motion Coordination of Multiple Wheeled Mobile Robots Transporting a Single Object, Jul. 26-30, 1993, Proceedings of the 1993 IEEE/RSJ International Conference on Intelligent Robots and Systems, pp. 1944-1951 (Year: 1993).*

Kube et al., Cooperative transport by ants and robots, 2000, Robotics and Autonomous Systems, pp. 85-101 (Year: 2000).*

* cited by examiner

MODULAR ROBOTIC SYSTEM

FIELD OF THE INVENTION

The field of the invention is autonomous robotic systems.

BACKGROUND

The use of robots to automate and streamline tasks is valuable to industries seeking to increase efficiency and throughput while reducing costs. Typically such robots are designed for specific, repeated actions (e.g., robots on an assembly line, Roomba® vacuum robots). Such robots involve high capital costs with a narrow field of application (i.e., the single or narrow set of intended function for the robot). There is a general interest in the market for relatively low cost robots that can operate interchangeably and adapt to a wide field of tasks. In particular, businesses dealing with the logistics of transporting or distributing goods are interested in fungible robots that can cooperate to transport and deliver a variety of loads.

Many have tried to satisfy this interest by robotic systems for traversing terrain. For example, U.S. Pat. No. 9,004,200 to Ben-Tzvi discloses a group of robots that can operate as a group and reconfigure its shape to accommodate changes in the terrain. The robots can be equipped with sensors for navigation, localization, and visual perception, along with wireless communication hardware. While the robots disclosed by Ben-Tzvi may modify its shape in order to traverse terrain, it fails to account for complications encountered in the transport of a load (e.g., load dimensions, weight, stability; how and where to engage a load). Ben Tzvi also does not disclose autonomous cooperation between the robots.

Many have tried to solve the problem of considering load dynamics in robotic transport systems. For example, PCT Publication No. 2012/125903 to Jacobsen discloses a robotic transport vehicle with transport modules configured to carry heavy loads over uneven terrain. The transport modules monitor vehicle movement and the surrounding environment to determine optimal position or configuration for the vehicle. While the robots disclosed by Jacobsen optimize configuration and transport path of the vehicle, Jacobsen fails to disclose fungible robots capable of autonomous analysis of a load or autonomous cooperation in transporting the load. Jacobsen also fails to consider changes in load stability during transit and the robotic systems response to such changes.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is a need for devices and methods generally fungible robots that autonomously analyze a load, autonomously cooperate to transport the load, autonomously monitor changes in load dynamics, and autonomously reconfigure the engagement of the robots with the load for stable transport.

SUMMARY OF THE INVENTION

The inventive subject matter provides methods, apparatus, devices, systems, kits, and compositions for generally fungible robots that autonomously cooperate to transport a load.

One inventive subject matter includes a method of transporting a load by a first robot and a second robot. Each of the robots has a motive mechanism, which is independently operable from each other. It is contemplated that each of the first and second robots obtains estimates of a width of the load (load width), a length of the load (load length) and a height of the load (load height). The load can have a prismic shape, a curvilinear 3-D shape, or have an irregular freeform shape. Each of the first and second robots also obtains estimates of a weight of the load (load weight). Each robot autonomously determines how to engage the load for transportation. In preferred embodiments, this determination is based at least partially on the load width, load length, load height, and load weight, as well as physical limitations of each robot and the terrain between the load and the delivery point. The robots then autonomously cooperate with each other to transport the load.

It is contemplated each robot obtains estimates of load width, length, height, and weight by appropriate sensors, including a LIDAR, an optical scanner, radar, mono-camera, stereo vision, 3D vision, an ultra-wide band sensor, an infrared scanner, a microwave scanner, a sonic scanner, ultra sonic sensors, encoders, proximity sensors, pressure sensors, a scale, a load sensor, or a strain gauge. In some embodiments, the second robot may obtain estimates from the first robot, and vice versa. First and second robots can also exchange and compare estimates to determine an estimate range or assess the accuracy of the estimates. Such data can also be exchanged robot-to-robot or vehicle-to-vehicle. It is also contemplated that the robots can obtain the estimates from an external source, such as a database of shipping manifests, database of prior efforts, an internet of things network, cloud storage, or other appropriate data source. In some embodiments, the first robot obtains an identification of a content of the load (load content) (e.g., gas, solid, liquid, plasma, composite, etc) or characteristics of the load content (e.g., fluid dynamics, stability, melting point, boiling point, volatility, pressure, temperature, etc).

In one aspect of the inventive subject matter, the robots autonomously determine how to engage the load for transportation by at least determining how many robots should transport the load (e.g., by considering physical limitations of robots, characteristics of the load, prior experience data, characteristics of the environment, number of available robots, budget constraints, etc) and then identifying a point of engagement on the load for each of the robots. In preferred embodiments, the number of robots and the points of engagement on the load are chosen in order to optimize a kinematic drive model for robots and the load. In some embodiments, the first robot recruits at least one additional robot to engage the load. It is also contemplated that the first robot can be substituted by a replacement robot if, for example, the first robot requires repair, requires charging, or otherwise jeopardizes transport of the load.

It is contemplated that the robots autonomously cooperate to transport the load. A transport path for the assembly of the robots and the load is autonomously determined by each robot in the assembly. In some embodiments, each robot shares the transport path it determined with the other robots in the assembly. Each robot can compare the shared paths with the path it determined to assess accuracy of the path and optimize the transport path. Such comparison can incorporate data from prior experiences and deep learning processing. It is contemplated as the robots continue to operate, the prior experience data will grow and transport paths can be further optimized. In some embodiments, each robot obtains estimates of its environment (e.g., contour, obstructions, grade, slope, surface type, hazards, etc) appropriate sensors, including at least one of a LIDAR, an optical scanner, radar, mono-camera, stereo vision, 3D vision, a GPS, an ultra-wide band sensor, an infrared scanner, a microwave scanner, a proximity sensor, or a sonic scanner.

Another inventive subject matter includes a method of transporting a load by a first robot and a second robot. Each of the robots has a motive mechanism, which is independently operable from each other. It is contemplated that each of the first and second robots obtains estimates of a width of the load (load width), a length of the load (load length) and a height of the load (load height). The load can have a prismic shape, a curvilinear 3-D shape, or have an irregular free-form shape. Each of the first and second robots also obtains estimates of a stability of the load (load stability). In light of the estimated load stability, each robot autonomously determines how to engage the load for stable transportation. In preferred embodiments, this determination is based at least partially on the load width, load length, load height, and load stability, as well as physical limitations of each robot and the terrain between the load and the delivery point. The robots then autonomously cooperate with each other to stably transport the load. It is contemplated that if or when the stability of the load changes, each of the robots autonomously reconfigures its engagement with the load in response to stabilize the load.

In some embodiments, estimating the load stability involves analyzing at least one of a weight, a weight distribution, a density, a density distribution, a center of mass, or a viscosity of the load. It is contemplated that the first robot can be substituted by a replacement robot. In preferred embodiments, this substitution is made to improve the load stability. In some embodiments, sensors (e.g., inertial measurement unit, inertial navigation system, gyroscope, accelerometer, etc) are used to monitor the driving kinematics of the assembly of robots and load. In preferred embodiments, data derived from such sensors is used to analyze load stability during transportation of the load.

DETAILED DESCRIPTION

Figure 1:
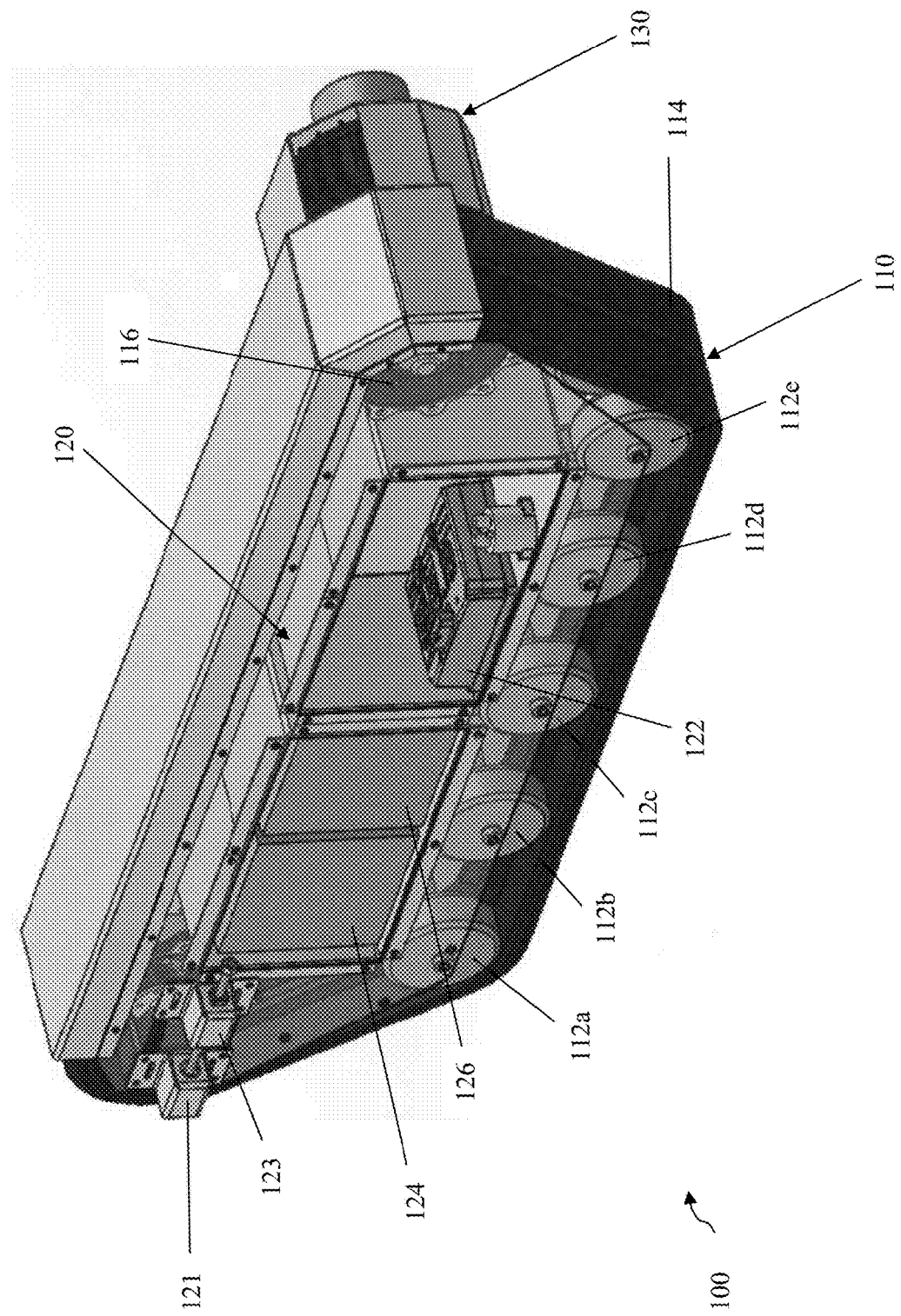
FIG. 1 is a side perspective view of a robot.

The inventive subject matter provides methods, apparatus, devices, systems, kits, and compositions for generally fungible robots that autonomously cooperate to transport a load or a plurality of loads.

The inventive subject matter includes a fungible robot that autonomously cooperates with other robots to transport a load. One embodiment is the robot 100 illustrated in FIG. 1. Robot 100 is made up of motive component 110, body component 120, and motor housing 130.

In this embodiment, motive component 110 comprises wheels 112a-e, track 114, and gear 116. It is contemplated that motive component 110 is capable of propelling robot 100 in at least two directions. It should be appreciated that the inventive subject matter is not limited to tracked robots, and can include other appropriate motive components, such as wheels, rollers, tracks, maglev, fluidic cushion, turbine, propeller, fluidic jet, mono-pedal, or multi-pedal mechanisms.

In this embodiment, motive component 110 is disposed about body component 120. Body component 120 includes integrated electronics 122, power source 124, power source 126, as well as length adjusters 121 and 123.

Integrated electronics 122 includes the electronic hardware and software to operate robot 100. This can include any combination of GPUs, CPUs, micro controllers, GPS devices, IMU devices, accelerometers, the various sensors described above, memory, databases, communication protocols, wireless communication protocols, etc.

Length adjusters are configured to lengthen or shorten the body of robot 100, such that the length of track 114 is increased or decreased. Such lengthening or decreasing the body of robot 100 has the effect of increasing or decreasing the slope of track 114 along the front portion of the robot (end opposite motor housing 130).

Power source 124 and 126 are typically batteries of any appropriate variety (e.g., Li-ion, etc), but can also be fuel cells or other portable power sources. In preferred embodiments, each of power sources 124 and 126 can be removed and replaced autonomously by robot 100. However, power sources 124 and 126 can also be replaced manually by a $3^{rd}$ party (e.g., a person, another robot, etc).

Motor housing 130 resides on one side of body component 120, as depicted in FIG. 1, and encloses an electric motor appropriate for powering a tracked vehicle. It should be appreciated that motor housing 130 can be reconfigured and located on various portions of robot 100 as required by the mobility limitations of robot 100 or a potential load.

Figure 2A:
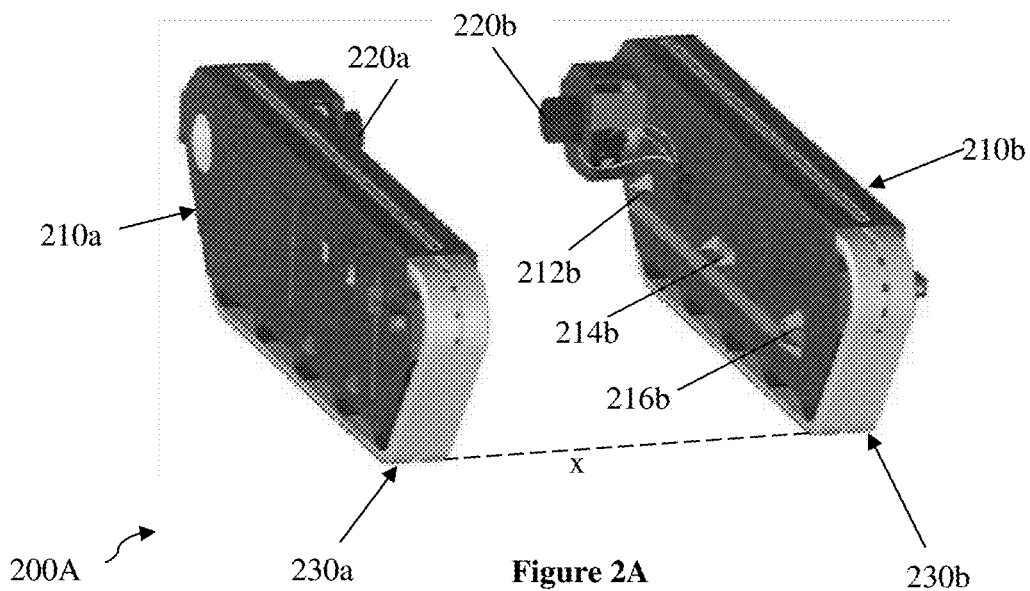
FIGS. 2A and 2B are front perspective views of a pair of robots.
Figure 2B:
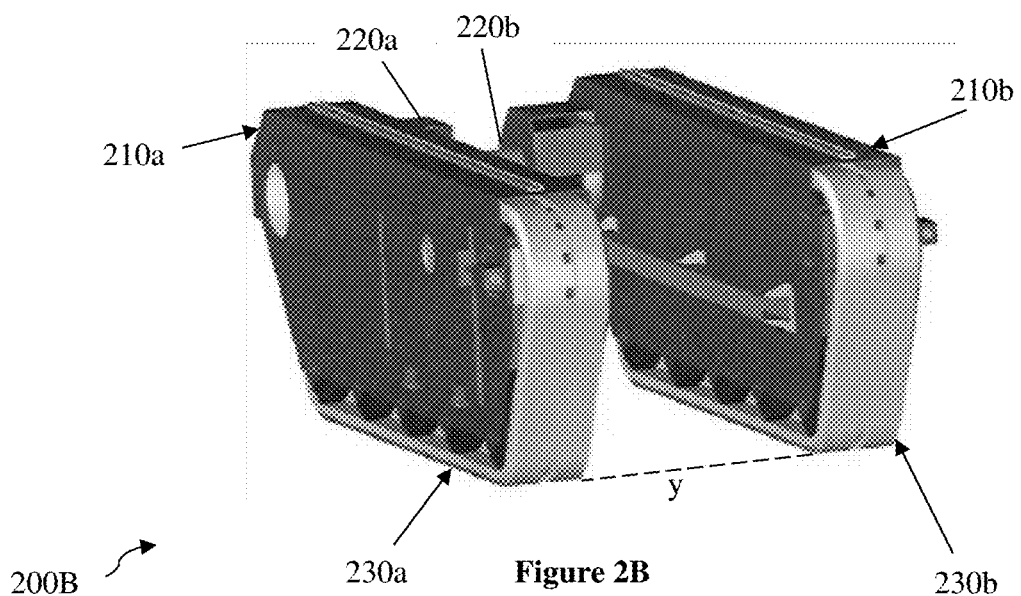

FIGS. 2A and 2B illustrate a pair of robots 200A, comprising robot 210a and robot 210b. While robots 210a and 210b are have mirrored constructions of each other, it is contemplated that the inventive subject matter includes robots with uniform construction, or robots with slight modifications from each other. Robots 210a and 210b include, respectively, motor housing 220a and 220b, and robot bodies 230a and 230b.

As depicted, robot 210b includes couplings 212b, 214b, and 216b the same side wall of robot 210a as motor housing 220b. This wall, as depicted, faces robot 210a. While not depicted, robot 210a also includes a mirrored grouping of couplings 212a, 214a, and 216a. Both sets of couplings on robot 210a and 210b are configured to couple, either indirectly or directly, to a load. FIG. 3B depicts an example of indirect coupling (via a platform), while FIG. 4 depicts an example of direct coupling.

In the depicted embodiment, robot bodies 230a and 230b both include tracked systems, but it should be appreciated that the bodies can include motive components as described above. Further, the motive components of robots 210a and 210b can be the same type of motive component, alterations of the same type of motive component, or completely different types of motive components.

In preferred embodiments, sensors configured to estimate a distance from robot 210a to robot 210b can be placed at any appropriate place along robot body 230a. It should be appreciated that each of robots 210a and 210b can add, remove, or otherwise reconfigure the sensors of each robot as suited to transport a given load. Sensors incorporated into each robot include any appropriate sensor or combinations of sensors, including a LIDAR, an optical scanner, radar, mono-camera, stereo vision, 3D vision, a GPS, an ultra-wide band sensor, an infrared scanner, a microwave scanner, a sonic scanner, or a wireless communication device. The distance between each robot can be measured, for example, from motor housing 220a to 220b, from a point along robot body 230a to a mirrored point along robot body 230b, or between any point of robot 210a and 210b. In preferred embodiments, sensors of robots 210a and 210b each autonomously and independently measure a distance "x" as depicted.

In some embodiments, sensors positioned on robot bodies 230a and 230b estimate distances between robots 210a and 210b once, but it should be appreciated that each sensor can detect distances intermittently at a rate of at least 1 cycle per minute, 1 Hz, 10 Hz, 100 Hz, or 1 kHz. When operating with low power, it is contemplated that such sensors estimate distances with reduced frequency, including once every 2 minutes, once every 5 minutes, once every 10 minutes, once every 15 minutes, or once every 30 minutes. In preferred embodiments, such data is used to improve a kinematic driving model for the robots and a load.

Figure 3A:
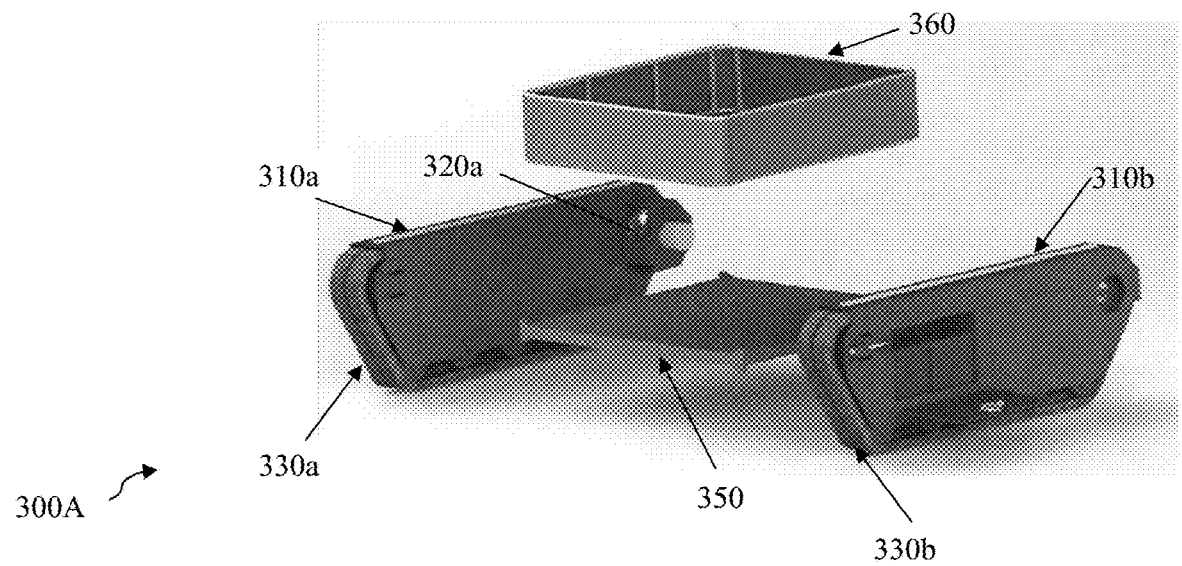
FIGS. 3A and 3B are front perspective views of a robot assembly.
Figure 3B:
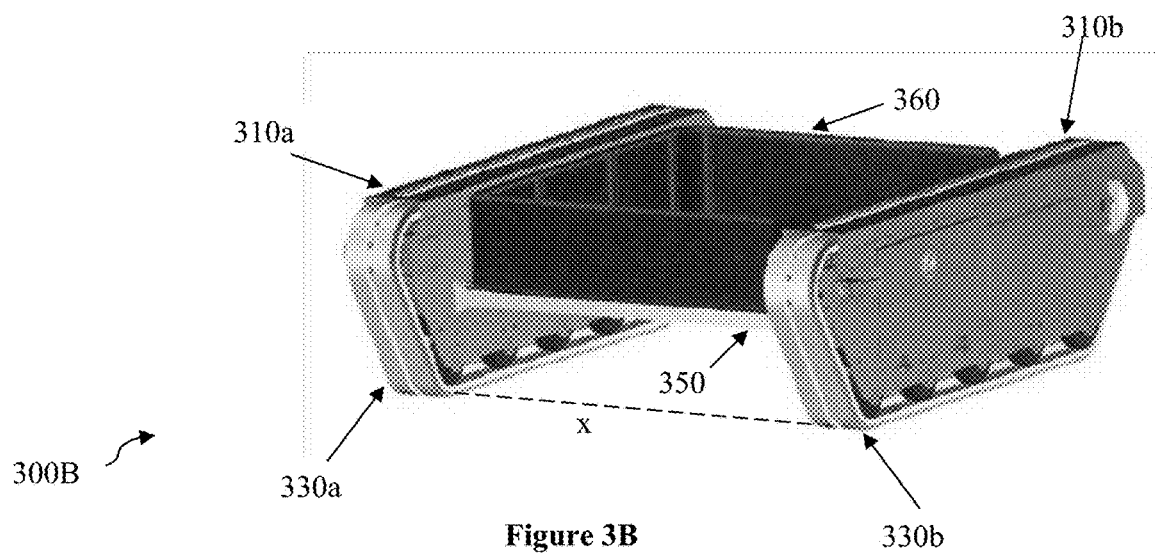
Figure 4:
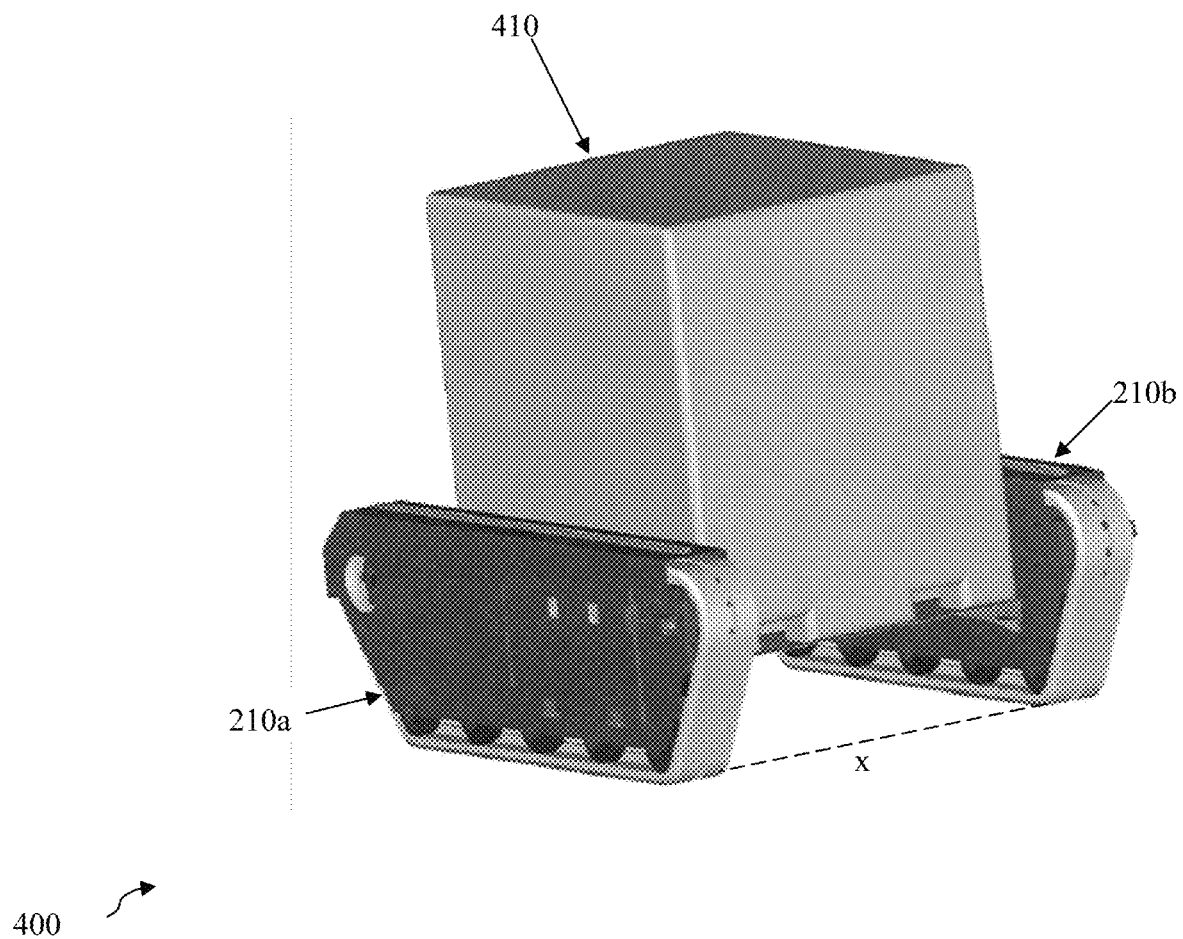
FIG. 4 is a front perspective view of a pair of robots and a load.

It should also be appreciated that sensors positioned on robot bodies 230a and 230b can be configured to obtain estimates of physical characteristics (e.g., length, width, height, weight, weight distribution, density, density distribution, center of mass, phase state, viscosity, state as gas, solid, liquid, or plasma, fluid dynamics, melting point, boiling point, volatility, pressure, temperature, radioactivity, economic value, fragility, etc) of a load or load contents (e.g., load 360 from FIG. 3A or 3B, or load 410 of FIG. 4). Such sensors can also obtain information from a database, RFID tag embedded in the load, a user, or other appropriate $3^{rd}$ party resources.

It is contemplated that robot 210a and robot 210a can exchange information such as estimates of distances that each robot has obtained, as well as any other information (e.g., load characteristics, etc) whether obtained independently or by $3^{rd}$ party source.

Sensors positioned on robot bodies 230a and 230b can also be configured to obtain environmental data (e.g., terrain contour, obstructions, grade, slope, surface type, hazards, weather conditions, enemy combatants, etc) and can employ a single sensor or a combination of sensors to obtain such data (e.g., a LIDAR, an optical scanner, radar, mono-camera, stereo vision, 3D vision, a GPS, an ultra-wide band sensor, an infrared scanner, a microwave scanner, a sonic scanner, or a wireless communication device.)

FIG. 2B illustrates robot pair 200B, which differs from robot pair 200A in that distance "y" of FIG. 2B is less than the distance "x" of FIG. 2A. In preferred embodiments, an estimate of distance "y" is obtained by sensors positioned on robot bodies 230a and 230b and used to adjust a kinematic driving model for the robots and a load.

FIGS. 3A and 3B illustrate robot assembly 300A and 300B, respectively. Both assemblies 300A and 300B include robots 310a and 310b, platform 350, and load 360. FIG. 3A depicts assembly 300A before robots 310a and 310b have been coupled to platform 350, while FIG. 3B depicts the coupled assembly 300B.

Robots 310a and 310b have similar structure and components as robots 210a and 210b from FIGS. 2A and 2B, respectively, including motor housings 320a and 320b, and robot bodies 330a and 330b.

In some embodiments, sensors positioned on robot bodies 330a and 330b are configured to estimate dimensions and load information for both platform 350 and load 360, as described above. In preferred embodiments, robots 310a and 310b autonomously couple to platform 350. However it should be appreciated that robots 310a and 310b can be manually coupled to platform 350 before the robot assembly transports load 360.

As depicted, load 360 is a container for depositing and removing additional loads. However, it should be appreciated that load 360 could be the load to be transported. It should be noted that when robots 310a and 310b are coupled to platform 350, a distance between robots 310a and 310b is defined by distance "x". In some embodiments, sensors positioned on robot bodies 330a and 330b estimate the actual distance between robots 310a and 310b, but it should be appreciated that such sensors estimate a dimension of platform 350 as the distance between robots 310a and 310b.

FIG. 4 illustrates robot assembly 400, which includes robots 210a and 210b as well as load 410. Robots 210a and 210b are as described in FIGS. 2A and 2B above. In this embodiment, robots 210a and 210b are directly coupled to load 410. It is contemplated that robots 210a and 210b can autonomously couple to load 410 as discussed in this application. It should be noted that when robots 210a and 210b are coupled to load 410, a distance between robots 210a and 210b is defined by distance "x". In some embodiments, lateral sensor components of robots 210a and 210b estimate the actual distance between robots 210a and 210b. However it should be appreciated that lateral sensor components of the robots can estimate a dimension of load 410 as the distance between robots 210a and 210b.

Figure 5:
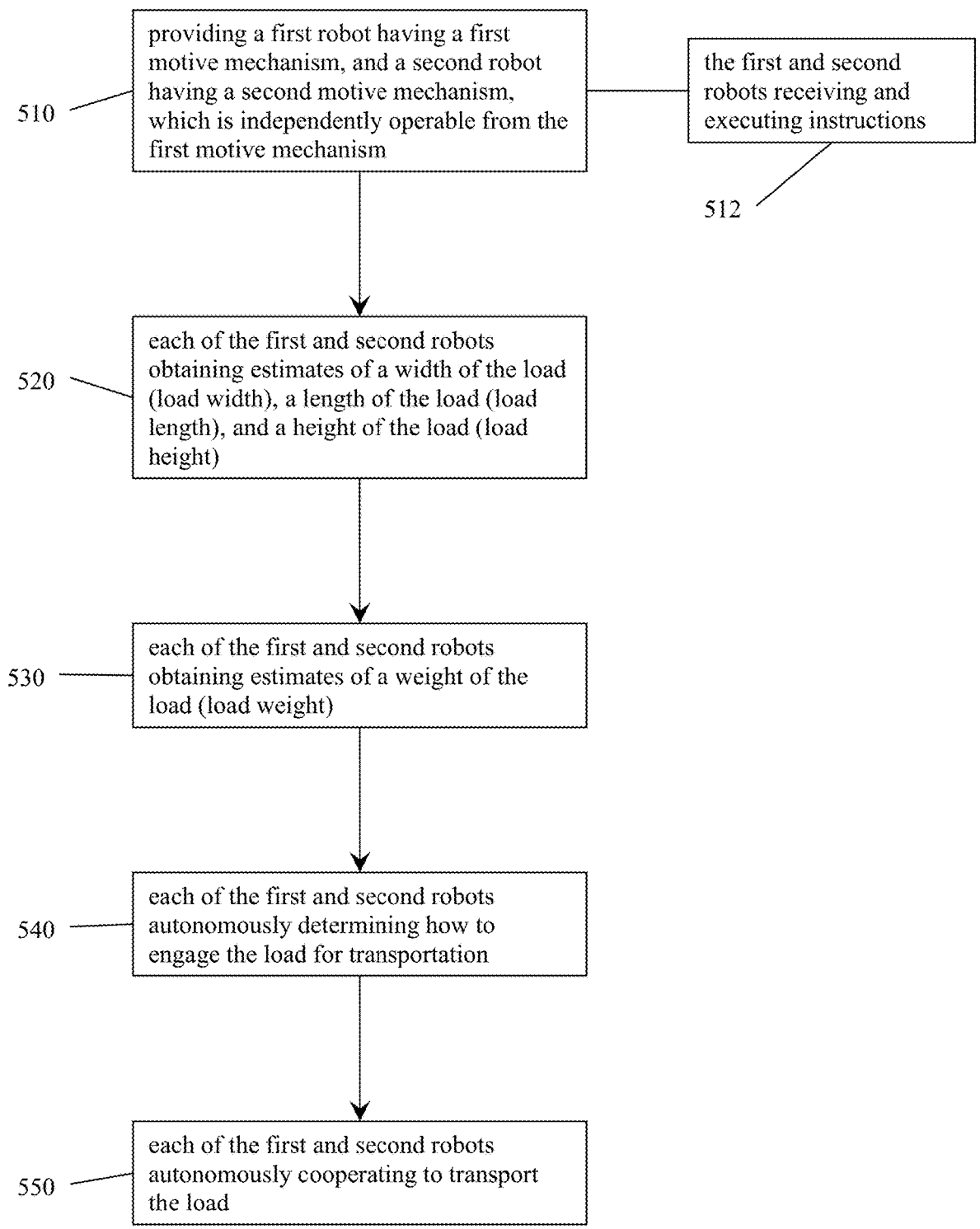
FIG. 5 is a flow chart for a method of transporting a load.

Another inventive subject matter includes a method of transporting a load by a first and a second robot. FIG. 5 depicts flow chart 500 of one embodiment of the method. In this embodiment, the method begins with step 510, which provides a first and second robot, each having a motive mechanism that is independently operable from the other. In step 520, each of the robots obtains estimates of a load width, a load length, and a load height, and in step 530 each robot obtains an estimate of the load weight. In step 540, each robot autonomously determines how to engage the load for transportation, and in step 550 each robot autonomously cooperates with the other robot to transport the load.

It should be appreciated that motive mechanisms of the first and second robots can be any appropriate mechanism, including wheels, rollers, tracks, maglev, fluidic cushion, turbine, propeller, fluidic jet, mono-pedal, or multi-pedal mechanism. In some embodiments, the motive mechanism of the first robot is different than the motive mechanism of the second robot. In preferred embodiments, the motive mechanisms of the first and second robots are of the same type and have similar specifications.

While it is contemplated that robots of the inventive subject matter operate without any instructions from a third party, optional step 512 of step 510 includes the robots receiving and executing instructions. While the instructions can involve the delivery or retrieval of various loads (e.g., goods, cargo, minerals, livestock, natural resources, supplies, food, water, medicine, personnel, equipment, armaments machines, robots, etc) to or from various locations (e.g., warehouse, subterranean location, underwater location, worksite, house, storage facility, customer's car, train, automobile, watercraft, aircraft, spacecraft, refugee camp, war zone, outer space, etc), in preferred embodiments the instructions comprise directions to move identified loads from one place to another place. The instructions may take the form of "move contents of warehouse A into the assigned truck(s)," as well as "retrieve item(s) for order B," or "deliver order C to shipping address."

Figure 6:
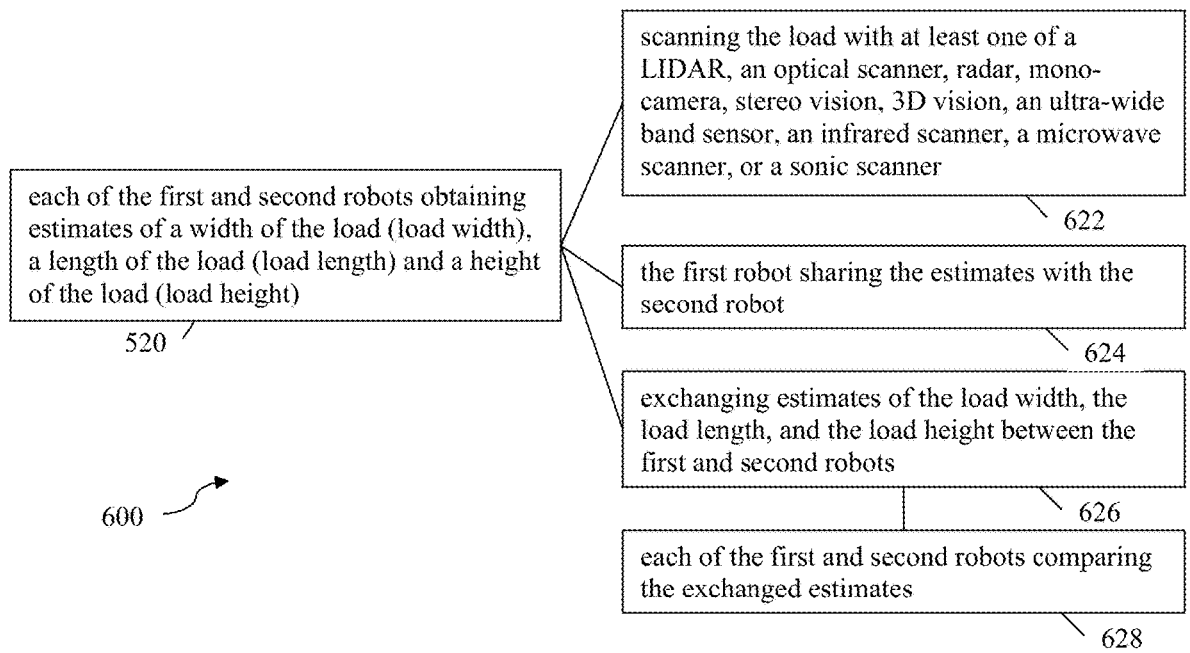
FIG. 6 is a flow chart for variations of one step in a method of transporting a load.

FIG. 6 depicts flow chart 600, which illustrates various contemplated embodiments of step 520 for obtaining estimates of load dimensions from FIG. 5. All elements with numbering similar to FIG. 5 are described as above. It is contemplated that the load can be any shape appropriate for containing an item, or the load itself may be the item to be transported. The load can have a prismic shape, a curvilinear 3-D shape, or have an irregular free-form shape.

In step 622, the estimates obtained in step 520 are obtained by scanning the load with at least one of a LIDAR, an optical scanner, radar, mono-camera, stereo vision, 3D vision, an ultra-wide band sensor, an infrared scanner, a microwave scanner, or a sonic scanner. It should be appreciated that other sensing or scanning devices capable of estimating the width, length, or height dimensions of the load may also be used, alone or in combination.

It is contemplated that the robots may obtain estimates of load width, length, or height from another robot, as depicted in step 624. It is also contemplated that each of first and second robots exchange its estimate with the other robot, as in step 626. In such embodiments, it is preferred that each robot compare the exchanged estimates as in step 628 to assess the accuracy of the estimates or to establish an estimate range to be used in generating a kinematic model for the robot and load assembly. Such comparative data can also be used for determining how to engage the load for transport in step 540.

Figure 7:
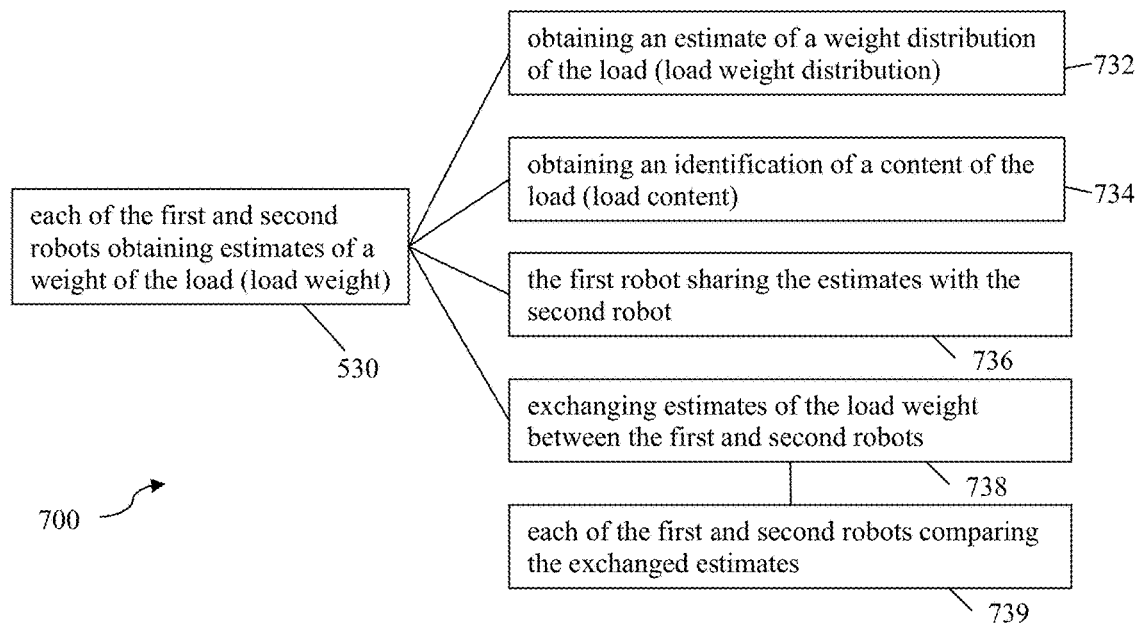
FIG. 7 is a flow chart for variations of another step in a method of transporting a load.

FIG. 7 depicts flow chart 700, which illustrates various contemplated embodiments of step 530 from FIG. 5. All elements with numbering similar to FIG. 5 are described as above. It is contemplated that the load weight estimate be obtained via a scale, a load sensor, a strain gauge, or other appropriate sensor. In some embodiments, the load weight may be obtained from a third party, such as a user, a database, or a shipping manifest.

In step 732, the robots also obtain an estimate of the weight distribution of the load. Such estimate can be obtained via any of the sensors or sources described above, or combinations. It is contemplated that the robots obtain identifying information of a content of the load. The identifying information can be as described above, and may be obtained by scanning an RFID tag associated with the load, or other appropriate means. It is further contemplated that load weight, weight distribution, and load content identification can be obtained via another robot, exchanged between robots, or compared, as described above with respect to step 520.

Figure 8:
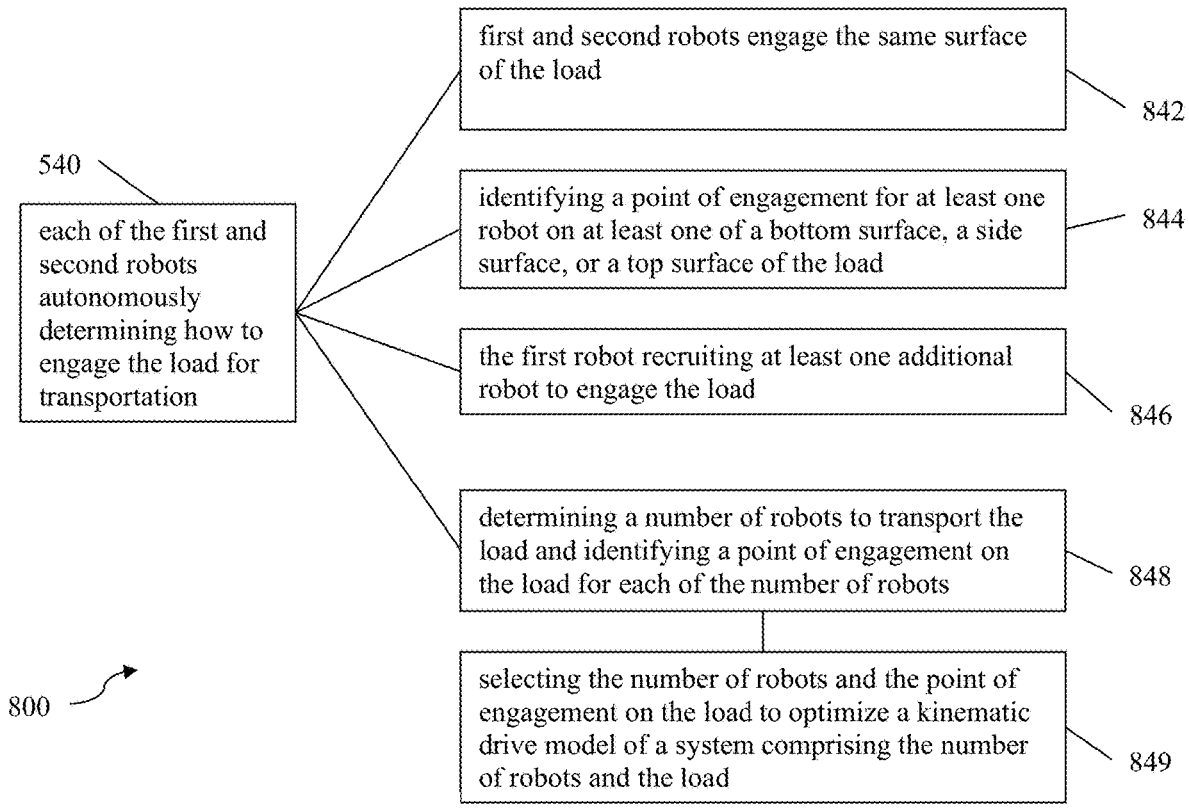
FIG. 8 is a flow chart for variations of still another step in a method of transporting a load.

FIG. 8 depicts flow chart 800, which illustrates various contemplated embodiments of step 540 from FIG. 5. All elements with numbering similar to FIG. 5 are described as above. In step 540, each of the robots autonomously determines how to engage the load for transportation.

It is contemplated that each robot identifies a place on the surface of the load for at least one robot to engage the load, as in step 844. The robots may engage the load in any appropriate manner, including coupling through mechanical (e.g., bracket, socket, latch, clasp, negative pressure, hook and loop, fork-lift, etc) electro-magnetic, or chemical (e.g., adhesive, etc) means. In some embodiments, the robots may indirectly engage the load via a platform, as depicted in FIGS. 3A and 3B. The robots may also engage the load via a suspension device (e.g., crane and hook, etc.). In some embodiments, the first and second robots engage the same surface of the load, as in step 842. However, it should be appreciated that the robots can engage different surfaces of the load, or each robot may engage multiple surfaces simultaneously.

In step 848, each robot determines how many robots should transport the load (e.g., by considering physical limitations of robots, characteristics of the load, characteristics of the environment, number of available robots, budget constraints, etc), and identifies a place on the load for each robot to engage ("robot assembly configuration"). In step 849 the number of robots and the points of engagement on the load are chosen in order to optimize a kinematic drive model for the assembly of robots and the load. In some embodiments, the first robot recruits at least one additional robot to engage the load as in step 846.

In some embodiments, it is contemplated the robots engage with a load and transport the load using a steering control system. The steering control system enhances performance (e.g., reducing wear and tear on wheels, increasing fuel efficiency) of the robot or the robot/load assembly (i.e. vehicle). The steering control system includes a number of sensors configured to estimate an environmental condition, a desired amount of turning of the vehicle, a desired velocity of the vehicle, or other drive kinematic values. Using these estimated parameters, a calculating controller sets a wheel torque (or track torque) and a wheel angle (not need for tracked vehicle) for at least one wheel of a robot, or at least one of the robot tracks (e.g. first robot track) of the robot/load assembly. An effecting controller applies the wheel torque and the correcting wheel angle to at least one wheel of the robot (or track of the robot/load assembly). It should be appreciated that considering the limitations of the vehicle and the environment before modifying the wheel angle or wheel torque substantially reduces, or even eliminates, the need to make corrections while the vehicle is on a desired path.

In some systems, the steering control system has an environmental condition sensor, a steering angle sensor, and a speed sensor. The environmental condition sensor can estimate the parameter of an environmental condition (e.g., a low visibility, a low traction, a temperature, an obstruction, a high wind, or a slope of road, other drive kinematic variables, etc.). The steering angle sensor can estimate a desired amount of turning for the vehicle. The speed sensor can estimate a desired velocity of the vehicle. A desired amount of turning refers to a change in vehicle direction made by a user (e.g., user turning steering wheel, steering control system receiving vector input, etc.), and a desired velocity refers to a change in vehicle velocity (e.g., user pushing a gas pedal, steering control system receiving a velocity input). Thus, the desired amount of turning and the desired velocity can collectively set a future location for the vehicle, and the starting position of the vehicle to the future location can define a desired path. It is contemplated that each of the desired amount of turning and the desired velocity can be a single value or can comprise multiple values to set a more complex vehicle path.

A calculating controller can be coupled to the environmental condition sensor, the steering sensor, or the speed sensor to receive the environmental condition, the desired amount of turning, or the desired velocity, respectively. With these parameters the calculating controller can determine inputs to a drive kinematic model, such as a wheel torque and a wheel angle a wheel of a robot (or track or other motive component of a robot in a robot/load assembly). The wheel angle is the angle the wheel is pointing (i.e., a steering angle of wheel), and the wheel torque is the torque applied to turn the wheel. In some embodiments, the wheel torque and the wheel angle can selected based partially an environmental condition, the desired amount of turning, and the desired velocity. The environmental condition, the desired amount of turning, and the desired velocity of the vehicle can be either estimated by a robot or obtained from a $3^{rd}$ party source (e.g., provided by a user, database, etc.).

The wheel angle can include a set of wheel angles or a single wheel angle for a wheel of a robot (or track or other motive component of a robot/load assembly). Similarly, the wheel torque can include a set of wheel torque values or a single wheel torque value. For example, the wheel angle and the wheel torque can be a set of values for a wheel of a robot (or other motive component) while the vehicle is traveling along a desired path. In some embodiments, set of values corresponds with the path of the vehicle to a future location or can be a more optimal path to the future location created by correcting the proposed wheel angle and the proposed wheel torque. Advantageously, there is a reduced risk that a correction will be needed by the vehicle as it travels along the desired path.

The environmental condition can be any number of conditions that may impose a burden on the vehicle. For example, the environmental condition can low visibility (e.g., rain, fog, dust, smoke, snow, etc.), low traction (e.g., water, ice, snow, loose material, etc.), temperature (e.g., high temperature, low temperature), physical obstruction (e.g., a vehicle or rock on the path), high wind, and slope of a terrain. By considering environmental conditions, steering control system can determine a correcting wheel angle and a correcting wheel torque to avoid or better handle the environmental condition as the vehicle travels along a desired path. It should be appreciated that in some embodiments the robot/load assembly can reconfigure itself to overcome obstructions in the assemblies path, or to account for changes in load stability.

It is contemplated that the steering control system receives a number of vehicle characteristics (i.e., properties of the vehicle), such as a weight of vehicle, a center of mass of vehicle, a distance between the first wheel and the second wheel (or other motive components of subcomponents of a robot), a length of the vehicle, a footprint of the vehicle, a width of the vehicle, a number of wheels of the vehicle, a size of the wheels of the vehicle, a steer angle range of the wheels of the vehicle, a steer angle speed of the vehicle, a camber range of the wheels of the vehicle, gradeability of the vehicle, a camber speed of the wheels of the vehicle, speed and torque capabilities of drive motors, or other drive kinematic variables. At least one of these vehicle characteristics is used to determine the correcting wheel torque and the correcting wheel angle (or correcting parameter for other motive components of a robot). These characteristics can be estimated by the robot or obtained $3^{rd}$ party source, such as a user or a database. It is contemplated that at least one vehicle characteristic can change after at least one of the correcting wheel angle and the correcting wheel torque have been applied. In such embodiments, the steering control system can further determine a second correcting wheel angle and a second correcting wheel torque to accommodate the changed vehicle characteristic.

The vehicle characteristics can be helpful in determining the boundaries for at least one of a correcting wheel angle and a correcting wheel torque. For example, calculating controller can receive the desired amount of turning, the desired velocity, and the environmental condition to thereby determine a correcting wheel torque and velocity that is within the torque capabilities and steer angle range of the wheel (or other appropriate motive component) to ensure the vehicle can perform the correcting wheel torque and the correcting velocity successfully. If a vehicle characteristic changes, the steering control system can detect the change and the calculating controller can determine a second correcting wheel torque and a second correcting wheel angle to accommodate the changed vehicle characteristic. For example, if the vehicle has four wheels that are each steerable but one wheel malfunctions, then the calculating controller can determine a second correcting wheel torque and a second correcting wheel angle for the remaining wheels to accommodate the change in the number of steerable wheels. It should be appreciated that accounting for vehicle characteristics ensures that the vehicle is capable of performing the steering controls (e.g., correcting wheel angle and torque) that are produced by the steering control system. It should also be appreciated that the failure of a motive component of a robot can prompt replacement of the defective component, or substitution of the entire robot in a robot/load assembly.

In some embodiments, the calculating controller independently determines (i) the correcting wheel torque and the correcting wheel angle for a first wheel of a robot (or other motive component), and (ii) a second correcting wheel torque and a second correcting wheel angle for a second wheel of the robot (or other motive component). In such embodiment, the effecting controller independently adjusts (i) the first wheel to apply the correcting wheel torque and the correcting wheel angle, and (ii) the second wheel to apply the second correcting wheel torque and the second correcting wheel angle.

It is contemplated the calculating controller obtain an estimate of the environmental condition, the desired amount of turning, or the desired velocity to thereby determine at least one of a correcting wheel camber or a correcting suspension of at least one wheel of a robot (or other motive component). A wheel camber is the angle between the vertical axis of a wheel and a vertical axis perpendicular to the flat ground, and wheel suspension is a vertical movement of a wheel relative to the chassis, load, or vehicle body. It should be appreciated that some of the vehicle characteristics can also be obtained by the calculating controller to determine the correcting wheel camber and the correcting suspension. The effecting controller can apply the correcting wheel camber and the correcting suspension to at least one wheel of a robot (or other motive component). It should be appreciated that adjusting wheel camber and suspension provides broader control over the vehicle and can reduce wear and tear of the wheels and optimize fuel efficiency.

It is contemplated that each robot can share robot assembly configuration data it has autonomously determined with other robots. Such sharing of data can include the physical configuration, physical limitations, and other drive kinematic variables of the robot/load assembly, such as the combined footprint of the vehicle and individual footprint of the robot, the combined and individual wheelbase, the combined and individual weight, the combined and individual number of wheels, the size of wheels, steering angle range of each robot, steering angle speed, suspension capabilities, camber speed, camber range, and speed and torque capabilities of each drive motor. In some embodiments, such data is updated and shared once per hour, in preferred embodiments one per minute, and in more preferred embodiments at least 60 Hz. Each robot can share such data regarding the entire robot assembly configuration, a portion of the configuration, or referential data to other points of the configuration (e.g., distance from inner surface of wheel 1 of robot 1 to inner surface of wheel 1 of robot 2, etc.) for each element of the configuration.

In some embodiments, each robot can reconfigure its own components (e.g., motive components, coupling appendages, drive train, sensor components, body shape, operative appendages, etc) to facilitate transportation of the load. For example, if a particular load is best transported while suspended from an arm or other crane-like appendage (e.g., cargo net, etc), the robot can add a crane-like component to its configuration. Further, if a load is heavy (e.g., ½ ton, 1 ton, 5 ton, etc) and must be transported over soft terrain (e.g. sand, mud, etc), a robot with a wheeled motive component can add a tracked motive component. It is contemplated that each robot can reconfigure itself based on the robots own assessment of the load and the environment, data obtained from other robots, data exchanged and compared between robots, or instructions received from a $3^{rd}$ party source such as a user, a database, or an RFID tag on the load.

It is contemplated that robots of the inventive subject matter can become integrated into larger robots by, for example, the robot engaging with various operable loads and cooperating with other robots to make the loads mobile. For example, a robot can modify its appendages (e.g., arm, coupling, welder, weapon, applicator, etc) by disengaging from a load suited for a first objective, and engaging with a different load suited for a second objective. When applied to a robotic arm, for example, the robot can disengage a first arm part and engage a second arm part to increase or decrease arm reach, arm strength, or attachment point on the robot, etc. The robot can also replenish its power source by replacing a part of the arm containing a power source (e.g., battery, etc). Such robots cooperate autonomously to mobilize the various loads.

As the physical dimensions or capabilities of loads are changed, the kinematic model of the robot/load assembly is autonomously adjusted by each robot. Such adjustments can be obtained from other robots, shared and compared between robots of the robot/load assembly, or obtained from $3^{rd}$ party sources such as users, a database, or RFID tag embedded in the load. It is contemplated this allows each robot to reconfigure itself or build a new robot/load assembly using a plurality of loads.

Figure 9:
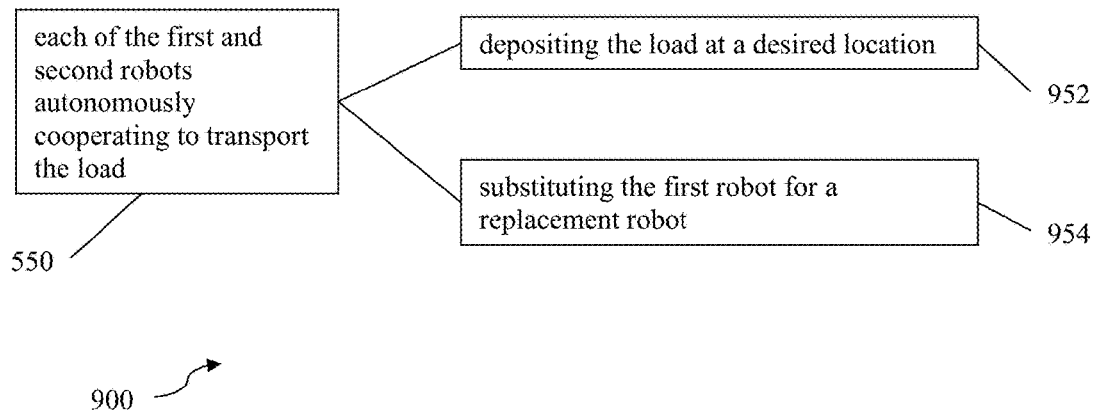
FIG. 9 is a flow chart for variations of yet another step in a method of transporting a load.

FIG. 9 depicts flow chart 900, which illustrates various contemplated embodiments of step 550 from FIG. 5. All elements with numbering similar to FIG. 5 are described as above. It is contemplated that after the robots of autonomously cooperated to transport the load via step 550, the robots deposit the load at a desired location, as in step 952. Such location can be defined with or without instructions from a $3^{rd}$ party, as described above with respect to step 512. Further, it is contemplated that the first robot be substituted by a replacement robot, as in step 954. In preferred embodiments, robots are substituted if, for example, the robot requires repair, requires charging, or otherwise jeopardizes transport of the load.

It should be appreciated that robots of the inventive subject matter can transport a load between two points, between multiple points with a defined deposit location, or between multiple points indefinitely with no deposit location. In some embodiments, the robots cooperate to mobilize the load as well as operate a functionality of the load (e.g., operate arm, torching device, drilling device, grappling device, weapon, lighting device, recording device, applicator device, cutting device, hammering device, nailing device, etc).

Figure 10:
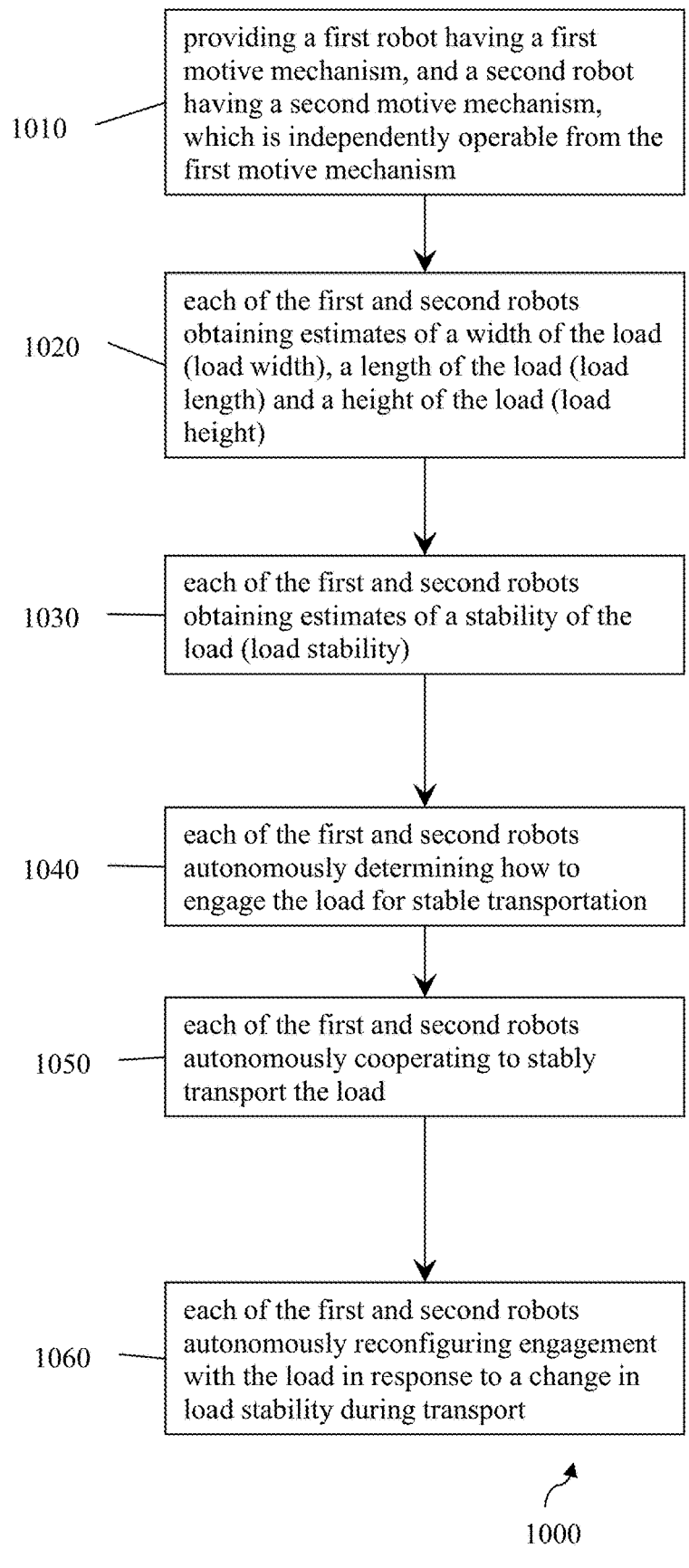
FIG. 10 is a flow chart for variations of a further step in a method of transporting a load.

Another inventive subject matter includes a method of stably transporting a load by a first and a second robot. FIG. 10 depicts flow chart 1000 of one embodiment of the method. In this embodiment, the method begins with step 1010, which provides a first and second robot, each having a motive mechanism that is independently operable from the other, as described above with step 510. In step 1020, each of the robots obtains estimates of a load width, a load length, and a load height in a manner as described in step 520, and in step 1030 each robot obtains an estimate of load stability. In step 1040, each robot autonomously determines how to engage the load for stable transportation, as described with respect to FIG. 8, and in step 1050 each robot autonomously cooperates with the other robot to stably transport the load. It is contemplated that as the load is transported by the robots, the stability of the load may change. In step 1060, each of the robots autonomously reconfigures its engagement with the load in response to changes in load stability during transport.

Figure 11:
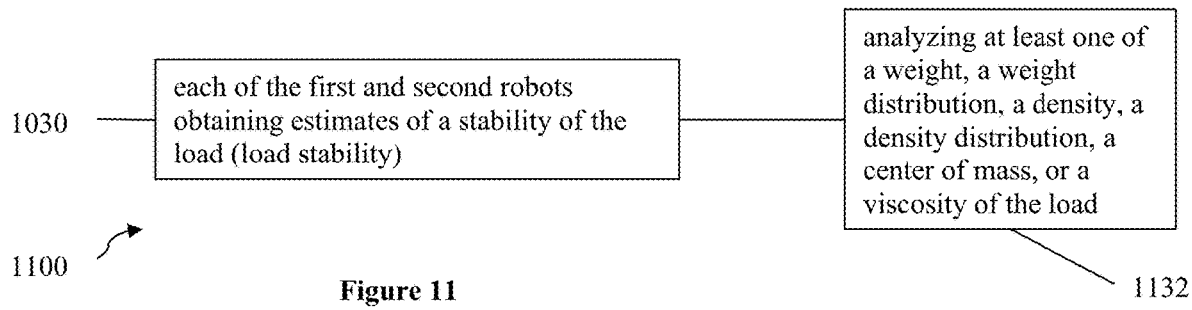
FIG. 11 is a flow chart for variations of an additional step in a method of transporting a load.

FIG. 11 depicts flow chart 1100, which illustrates a contemplated embodiment of step 1030 for obtaining estimates of load stability from FIG. 10. All elements with numbering similar to FIG. 10 are described as above. In step 1030, each of the first and second robots obtains estimates of load stability. In some embodiments, estimating the load stability involves analyzing at least one of a weight, a weight distribution, a density, a density distribution, a center of mass, a phase state, or a viscosity of the load. Other variables of the load that can be analyzed to estimate load stability include load composition (e.g., gas, solid, liquid, plasma, composite, etc) or characteristics of the load (e.g., fluid dynamics, melting point, boiling point, volatility, pressure, temperature, radioactivity, economic value, fragility, etc). It is also contemplated the robots analyze the described load variables in view of the load dimensions (e.g., length, width, height).

It is contemplated that the robots can obtain estimates from sensors as described above, or an external source, such as a database of shipping manifests, RFID tags embedded in the load, user input, or other appropriate data. As described above in at least steps 624, 626, and 628, it is contemplated that one robot share estimates with another, that robots exchange estimates, and that robots compare all estimates to determine an estimate range or assess estimate accuracy.

Figure 12:
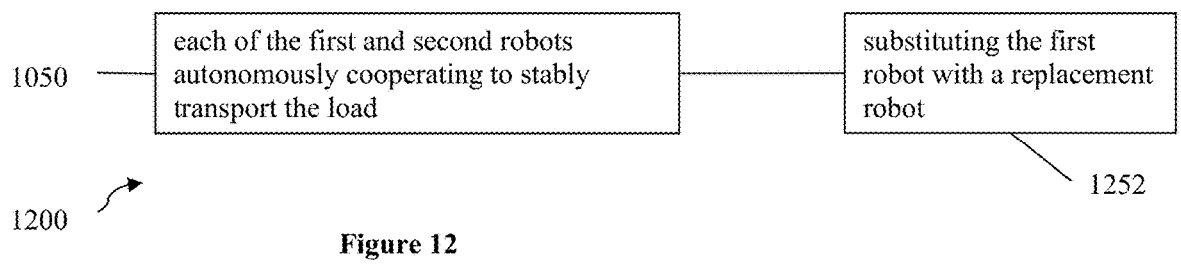
FIG. 12 is a flow chart for variations of even another step in a method of transporting a load.

FIG. 12 depicts flow chart 1200, which illustrates a contemplated embodiment of step 1050 for autonomously cooperating to stably transport the load from FIG. 10. All elements with numbering similar to FIG. 10 are described as above. In light of the estimated load stability, each robot autonomously determines how to engage the load for stable transportation in step 1050. In some embodiments, this determination is based at least partially on the load width, load length, load height, and load stability, as well as physical limitations of each robot and the terrain between the load and the delivery point. In preferred embodiments, these variables are considered by each robot and used to determine a robot/load assembly with an optimized kinematic driving model.

In some embodiments, the robots autonomously cooperate with each other to apply the kinematic driving model and stably transport the load. Sensors (e.g., inertial measurement unit, inertial navigation system, gyroscope, accelerometer, etc) on each robot can be used to monitor the driving kinematics of the robot/load assembly. In some embodiments, each robot independently monitors drive kinematic variables of the assembly during transport with a frequency of once per minute, 1 Hz, 10 Hz, 100 Hz, or 1 kHz. In preferred embodiments, each robot exchanges such information with other robots in the assembly in real time to provide further enhancement of the kinematic driving model. It is contemplated that if or when the stability of the load changes, each of the robots autonomously reconfigures its engagement with the load in response to stabilize the load.

It is contemplated that the robots stably transport the load such that the load is not damaged in transit and the load successfully reaches a desired delivery point. In some embodiments, the load stability includes a load stability factor representative of the stability of the load. In some embodiments, the load stability factor of a load at rest before it has been engaged by robots for transport is the target load stability factor. In other embodiments, a target load stability factor may be derived from load stability variables discussed above, or can be obtained from a shipping manifest database, an RFID tag embedded in the load, user input, or other appropriate source. It is contemplated that a movement of the load by the robots may result in a deviation of the load stability factor from the target load stability factor. However, such movement should not result in a deviation of the load stability factor from the target load stability factor of more than 1%, more than 2%, more than 3%, more than 4%, more than 5%, more than 10%, more than 15%, or more than 25%. The load stability factor can be determined by a comparison and analysis of load stability variables as discussed above with respect to FIG. 11.

It is contemplated each robot can monitor its own condition and the condition of other robots in the robot/load assembly, including state of repair, scheduled maintenance, driving performance, physical limitations, state of power source, and other conditions of each robot that may hinder stable transportation of the load. In preferred embodiments, such data is shared between the robots. In step 1252, the first robot can be substituted by a replacement robot. In preferred embodiments, this substitution is made based on the condition of the first robot such that replacing the first robot will improve load stability or stable transport of the load.

Figure 13:
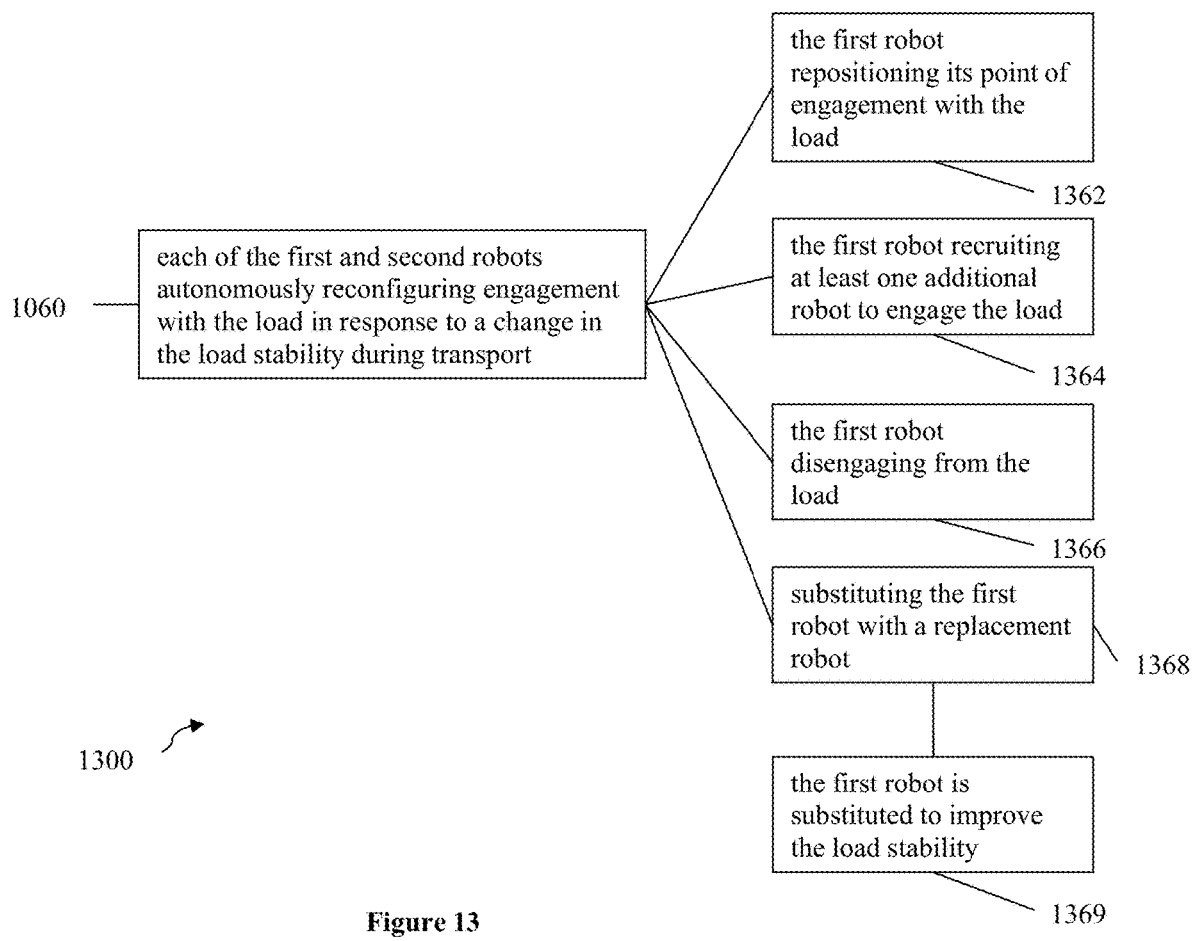
FIG. 13 is a flow chart for variations of again another step in a method of transporting a load.

FIG. 13 depicts flow chart 1300, which illustrates various contemplated embodiments of step 1060 for responding to a change of load stability during transport of the load from FIG. 10. All elements with numbering similar to FIG. 10 are described as above. In some embodiments, sensors (e.g., inertial measurement unit, inertial navigation system, gyroscope, accelerometer, etc) are used to monitor the driving kinematics of the assembly of robots and load. In preferred embodiments, data derived from such sensors is used, along with load stability variables, to analyze the load stability during transportation of the load. As described above, the load stability can include a load stability factor that is representative of the stability of the load.

It should be appreciated that the engagement of each robot with the load per the determination of step 1040 and the stable transportation of the load per step 1050 are designed and orchestrated to maintain any deviation of the load stability factor from a target load stability factor to within a tolerance of 1%, within 2%, within 3%, within 4%, within 5%, within 10%, within 15%, or within 25%. It should also be appreciated that, during transport, the load stability factor may deviate from the target load stability factor beyond the specified tolerance. It is contemplated in step 1060 that during transport of the load should this deviation happen, each robot autonomously reconfigure its engagement with the load in order return the load stability factor to within the specified tolerance.

It should be appreciated that a robot/load assembly can include a single load, multiple loads of the same type, or multiple loads of various types. In some embodiments, the robot/load assembly includes one load that is a robotic arm and another load. The robotic arm can receive and share information with the robots of the robot/load assembly, including load stability information, environmental information, robot limitation information, or other driving kinematics information. In preferred embodiments, the robotic arm obtains estimates of the center of mass of the robot/load assembly before the assembly begins moving and preferably during transport at least 30 minute, 20 minute, 10 minute, 5 minute, 2 minute, or 1 minute intervals, more preferably at a frequency of 1 Hz, 10 Hz, 100 Hz, 1 kHz, or 10 kHz. In preferred embodiments the robotic arm can manipulate and reconfigure components of the robot/load assembly (e.g., individual mobility robots, the robotic arm, sensors on the assembly, one load, multiple loads, etc).

It is contemplated the robotic arm reconfigure components of the robot/load assembly such that, at any point along the transport path, the center of mass and terrain do not cause the load stability factor to deviate beyond a tolerance from the target load stability factor. Viewed from another perspective, a robotic arm on the robot/load assembly can reconfigure components of the assembly such that the assembly does not tip over when crossing uneven or sloped terrain. It should be appreciated that the robotic arm can also change its shape, configuration, position, or orientation on the assembly to favorably alter the center of mass of the assembly and maintain the load stability factor within a tolerance from the target load stability factor.

In step 1362, in order to return the load stability factor to within the specified tolerance the first robot determines an engagement position for itself that is predicted to improve the load stability, and re-engages the load at that position. It is contemplated that the first robot may recruit at least one additional robot to engage the load, such that the load stability is improved to within the specified tolerance, as per step 1364. It is also contemplated that the first robot disengage from the load in order to improve load stability, as in step 1366. In step 1368, the first robot may be substituted by a replacement robot if, for example, the first robot is ill-equipped for transporting the load, is in disrepair, or otherwise hinders transport of the load. In preferred embodiments, the replacement of the first robot improves the load stability as in step 1369.

In some embodiments, a load engaged by a robot inoperative, such as cargo or raw materials. However, it is contemplated that loads can have a function or be operable (e.g., manipulators such as a robotic arm, multi-tools, etc). For example, a robotic arm can be engaged by one or more mobility robots such that the robotic arm, which is generally immobile by itself, is mobile via the robots. The robotic arm can operate independently from the mobility robots (e.g., robotic arm has its own logic component, etc), can cooperate with the mobility robots (e.g., exchange information between robotic arm and mobility robots to accomplish objectives, etc), can be controlled by some of the mobility robots (e.g., mobility robots use robotic arm as additional mode of mobility, etc), or can be operated by a $3^{rd}$ party (e.g., remote user controls arm via joystick). It is contemplated that a robotic arm can include a multi-tool attachment to enable multiple types of tools to be used by the same robotic arm.

In some embodiments, the robotic arm (or other load) has a dominant-subservient relationship with the mobility robots in a robot/load assembly such that the robotic arm issues commands (or otherwise controls) to some of the mobility robots to enable the robotic arm to complete an objective. For example, the robotic arm can instruct the mobility robots to transport the robotic arm to a location where, upon delivery, the robotic arm can perform an operation.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of transporting an assembly comprising a load, a first robot, and a second robot to more than one point without a deposit location, the method comprising:

the first robot having an objective of transporting the assembly;

each of the first and second robots independently determining how to engage the load for transportation of the assembly by:

(1) determining how many robots should transport the load based on an experiential data, a hardware limitation of the first or second robot, and a characteristic of the load; and (2) considering an environmental condition affecting the objective;

the first and second robots cooperating to stably transport the assembly by:

(1) each of the first and second robots independently determining a path to satisfy the objective based on a first local environment estimate;

(2) each of the first and second robots sharing the path with other robots of the assembly to form an optimized path; and (3) the assembly proceeding along the optimized path;

reconfiguring a coupling of the first or second robot with the load in response to a change in stability of the load; and reconfiguring the assembly in response to a second local environment estimate along the optimized path.

2. The method of claim 1, wherein the step of reconfiguring the assembly in response to the second local environment estimate avoids an obstruction in the optimized path.

3. The method of claim 1, wherein each of the first and second robots independently determines the first and second local environment estimates.

4. The method of claim 3, wherein reconfiguring the assembly improves a kinematic drive model of the assembly.

5. The method of claim 4, wherein the load comprises a robotic arm, and wherein the robotic arm operates independently from the first robot.

6. The method of claim 1, wherein each of the first and second robot independently determines the environmental condition.

7. The method of claim 1, wherein the first and second robots cooperate to operate a functionality of the load.

8. The method of claim 1, wherein reconfiguring the assembly comprises maintaining a component of the first robot from the list consisting of a motive component, a coupling appendage, a body shape, or an operative appendage.

9. The method of claim 1, further comprising the first robot engaging with an immobile, operable load selected from the group consisting of a multi-tool, a coupling, a welder, a weapon, an applicator, a battery, a drilling device, a lighting device, a recording device, a cutting device, a hammering device, and a nailing device.

10. The method of claim 1, wherein the deposit location exists but is not defined to the first robot or the second robot while the assembly is transported between multiple points.

11. The method of claim 1, further comprising the step of each of the first and the second robots sharing with other robots of the assembly the respective independent determinations of how to engage the load.

12. The method of claim 1, wherein the first and second robot reconfigure the coupling of the first or second robot with the load to improve stability of the load.

13. The method of claim 1, wherein a stability factor of the load deviates by no more than 25% from a target load stability factor during transport.

14. The method of claim 1, wherein the assembly operates without instruction from a third party outside of the assembly.

* * * * *